United States Patent
Kawasaki et al.

(10) Patent No.: US 12,340,690 B2
(45) Date of Patent: *Jun. 24, 2025

(54) TRAFFIC SIGNAL INFORMATION DISTRIBUTION SYSTEM, AND TRAFFIC SIGNAL INFORMATION DISTRIBUTION METHOD

(71) Applicant: SUMITOMO ELECTRIC INDUSTRIES, LTD., Osaka (JP)

(72) Inventors: Norikazu Kawasaki, Osaka (JP); Masafumi Kobayashi, Osaka (JP); Hiroyuki Ishimaru, Osaka (JP); Shin Yamamoto, Tokyo (JP); Tomoko Yasui, Nagoya (JP); Yoshikazu Toyama, Tokyo (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 33 days.

This patent is subject to a terminal disclaimer.

(21) Appl. No.: 18/230,211

(22) Filed: Aug. 4, 2023

(65) Prior Publication Data

US 2023/0401955 A1    Dec. 14, 2023

Related U.S. Application Data

(63) Continuation of application No. 17/280,933, filed as application No. PCT/JP2019/038593 on Sep. 30, 2019, now Pat. No. 11,756,422.

(30) Foreign Application Priority Data

Oct. 12, 2018    (JP) .................................. 2018-193658

(51) Int. Cl.
*G08G 1/09*    (2006.01)
*G08G 1/095*   (2006.01)

(52) U.S. Cl.
CPC ............. *G08G 1/091* (2013.01); *G08G 1/095* (2013.01)

(58) Field of Classification Search
CPC ............................... G08G 1/091; G08G 1/095
See application file for complete search history.

(56) References Cited

U.S. PATENT DOCUMENTS

| 10,255,805 | B1   | 4/2019 | Wolf et al. |
| 11,756,422 | B2 * | 9/2023 | Kawasaki .......... G08G 1/09675 340/907 |

(Continued)

FOREIGN PATENT DOCUMENTS

| JP | H08-002285 A | 1/1996 |
| JP | 2011-065554 A | 3/2011 |
| JP | 2017-169068 A | 9/2017 |

*Primary Examiner* — Curtis A Kuntz
*Assistant Examiner* — James E Munion
(74) *Attorney, Agent, or Firm* — Oliff PLC

(57) ABSTRACT

A signal information distribution system includes: a storage unit configured to store therein a timing table including scheduled lighting intervals of the plurality of signal lights; a monitor unit configured to observe lighting and extinction of the plurality of signal lights; a generation unit configured to generate the signal information, based on an actual lighting interval, of a predetermined signal light among the plurality of signal lights, obtained from an observation result of the predetermined signal light, and on the scheduled lighting interval, of the predetermined signal light, included in the timing table; and a distribution unit configured to distribute, to the vehicles, the signal information generated by the generation unit.

4 Claims, 12 Drawing Sheets

(56) References Cited

U.S. PATENT DOCUMENTS

| | | |
|---|---|---|
| 2017/0084172 A1* | 3/2017 | Rolle .................. G08G 1/0129 |
| 2017/0273039 A1 | 9/2017 | Adachi |
| 2021/0010820 A1 | 1/2021 | Zekiros et al. |

* cited by examiner

| USE TIME SLOT | STEP | 1 | 2 | 3 | 4 | 5 | 6 |
|---|---|---|---|---|---|---|---|
| 07:00-17:00 | MAJOR ROAD LIGHT COLOR | GREEN | YELLOW | RED | RED | RED | RED |
| | MINOR ROAD LIGHT COLOR | RED | RED | RED | GREEN | YELLOW | RED |
| | CONTINUATION INTERVAL | 64 | 3 | 3 | 54 | 3 | 3 |

14b

| USE TIME SLOT | STEP | 1 | 2 | 3 | 4 | 5 | 6 |
|---|---|---|---|---|---|---|---|
| 17:00-21:00 | MAJOR ROAD LIGHT COLOR | GREEN | YELLOW | RED | RED | RED | RED |
| | MINOR ROAD LIGHT COLOR | RED | RED | RED | GREEN | YELLOW | RED |
| | CONTINUATION INTERVAL | 74 | 3 | 3 | 54 | 3 | 3 |

14c

| USE TIME SLOT | STEP | 1 | 2 | 3 | 4 | 5 | 6 |
|---|---|---|---|---|---|---|---|
| 21:00-07:00 | MAJOR ROAD LIGHT COLOR | GREEN | YELLOW | RED | RED | RED | RED |
| | MINOR ROAD LIGHT COLOR | RED | RED | RED | GREEN | YELLOW | RED |
| | CONTINUATION INTERVAL | 54 | 3 | 3 | 34 | 3 | 3 |

14d

| USE TIME SLOT | STEP | 1 |
|---|---|---|
| MAINTENANCE | MAJOR ROAD LIGHT COLOR | FLASHING YELLOW |
| | MINOR ROAD LIGHT COLOR | FLASHING RED |
| | CONTINUATION INTERVAL | - |

FIG. 5

| TIME | MAJOR ROAD | MINOR ROAD |
|---|---|---|
| 10:00:00-10:01:04 | GREEN | RED |
| 10:01:04-10:01:07 | YELLOW | RED |
| 10:01:07-10:01:10 | RED | RED |
| 10:01:10-10:02:04 | RED | GREEN |
| ⋮ | ⋮ | ⋮ |

— 40

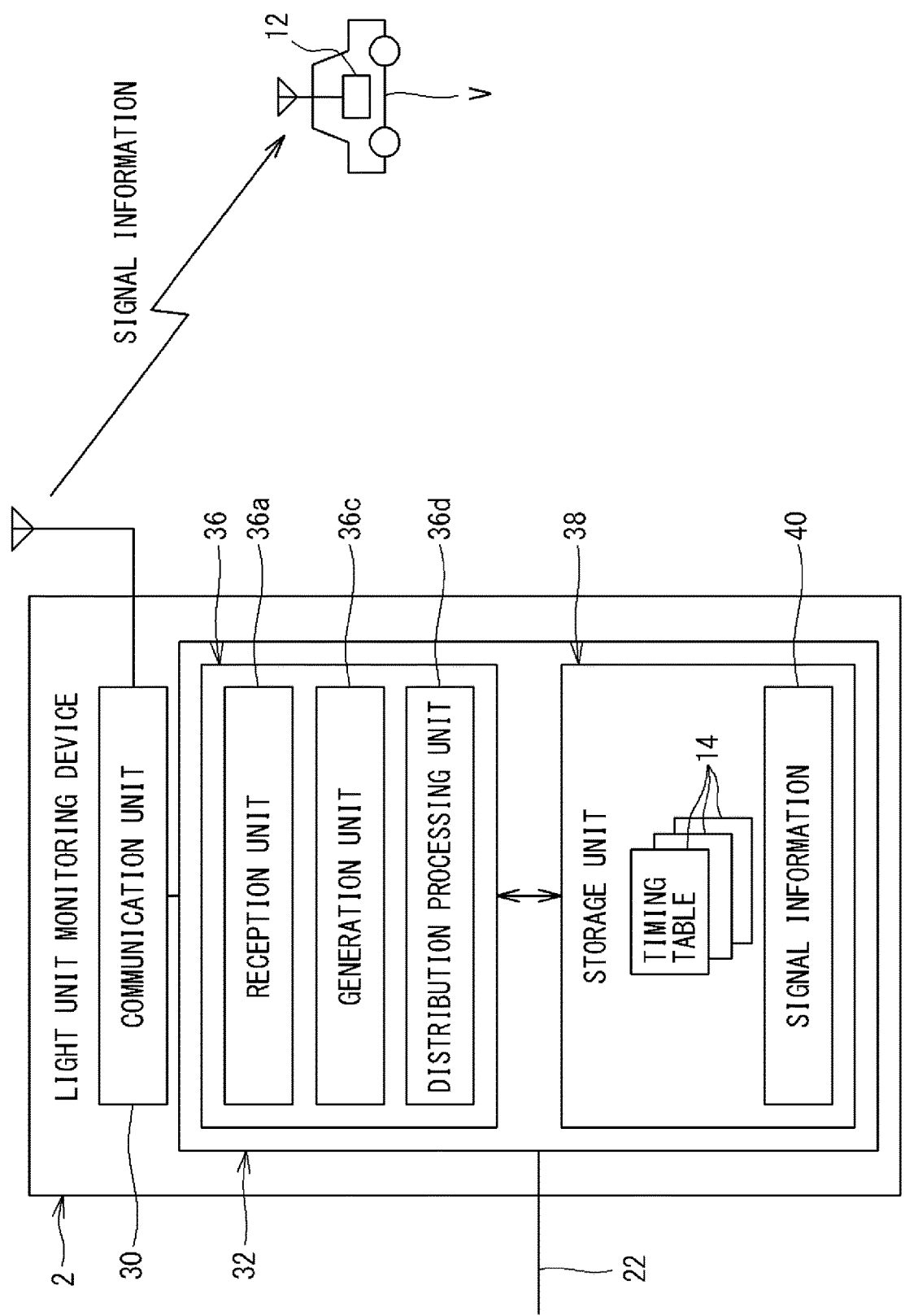

TRAFFIC SIGNAL INFORMATION DISTRIBUTION SYSTEM, AND TRAFFIC SIGNAL INFORMATION DISTRIBUTION METHOD

CROSS REFERENCE TO RELATED APPLICATION

This application is a continuation of U.S. application Ser. No. 17/280,933, filed Mar. 29, 2021, the contents of which are incorporated herein by reference.

TECHNICAL FIELD

The present disclosure relates to a signal information distribution system, and a signal information distribution method.

This application claims priority on Japanese Patent Application No. 2018-193658 filed on Oct. 12, 2018, the entire content of which is incorporated herein by reference.

BACKGROUND ART

In recent years, for the purposes of enhancing traffic safety, avoiding traffic accidents, and supporting automated driving, an intelligent transport system, which enhances safety of vehicles by utilizing information received from infrastructure devices installed on roads, has been studied (refer to PATENT LITERATURE 1, for example).

A communication system which forms a part of the intelligent transport system is composed of a plurality of roadside communication devices which are infrastructure-side wireless communication devices, and a plurality of on-vehicle communication devices which are wireless communication devices mounted on vehicles.

CITATION LIST

Patient Literature

PATENT LITERATURE 1: Japanese Laid-Open Patent Publication No. 08-2285

SUMMARY OF INVENTION

A signal information distribution system according to one embodiment is a system configured to distribute, to vehicles, signal information including a lighting start time and a lighting continuation interval of each of a plurality of signal lights of a signal light unit installed at an intersection, each signal light being configured to light in a predetermined color. The system includes: a storage unit configured to store therein a timing table including scheduled lighting intervals of the plurality of signal lights; a monitor unit configured to observe lighting and extinction of the plurality of signal lights; a generation unit configured to generate the signal information, based on an actual lighting interval, of a predetermined signal light among the plurality of signal lights, obtained from an observation result of the predetermined signal light, and on the scheduled lighting interval, of the predetermined signal light, included in the timing table; and a distribution unit configured to distribute, to the vehicles, the signal information generated by the generation unit.

A signal information distribution method according to another embodiment is a method for distributing, to vehicles, signal information including a lighting start time and a lighting continuation interval of each of a plurality of signal lights of a signal light unit installed at an intersection, each signal light being configured to light in a predetermined color. The method includes: causing a storage unit to store therein a timing table including scheduled lighting intervals of the plurality of signal lights; observing lighting and extinction of the plurality of signal lights; generating the signal information, based on an actual lighting interval, of a predetermined signal light among the plurality of signal lights, obtained from an observation result of the predetermined signal light, and on the scheduled lighting interval, of the predetermined signal light, included in the timing table; and distributing the signal information to the vehicles.

BRIEF DESCRIPTION OF DRAWINGS

FIG. 3 shows examples of timing tables.

FIG. 5 shows an example of signal information.

FIG. 12 is a block diagram showing an example of a function of a light unit monitoring device according to a third embodiment.

DESCRIPTION OF EMBODIMENTS

Figure 1:
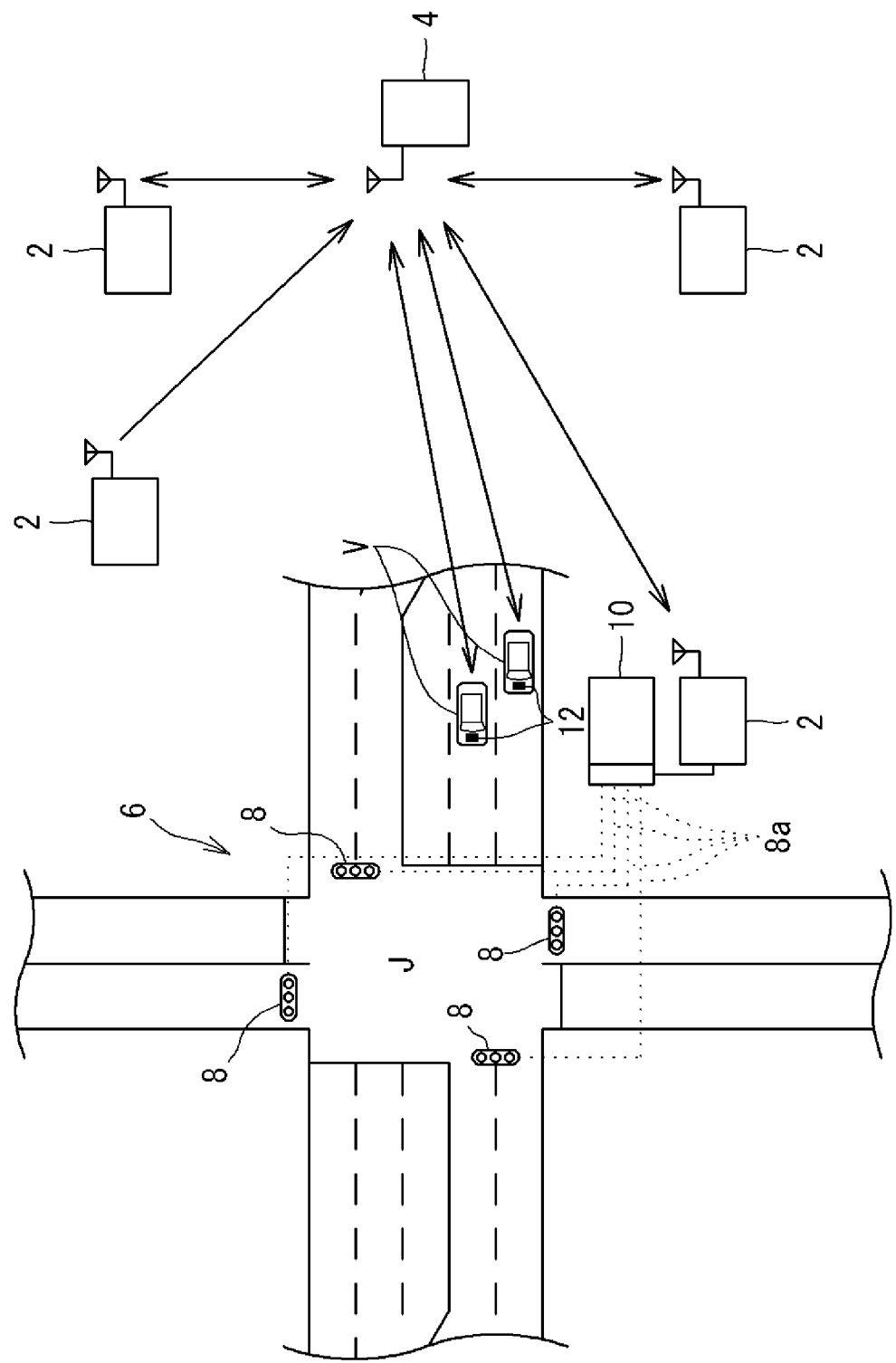
FIG. 1 shows an example of a schematic configuration of a signal information distribution system according to one embodiment.

Problems to be Solved by the Present Disclosure

In the conventional example, each roadside communication device transmits signal information, such as a remaining interval of a light color of a signal light unit, to the on-vehicle communication devices through wireless communication.

In order to generate the signal information, the roadside communication device needs to access a signal controller that controls the signal light unit and acquire control information for the signal light unit.

Therefore, when a roadside communication device is installed at an intersection, it is conceivable to replace a signal controller of a signal light unit already installed at the intersection with a signal controller to which the roadside communication device is connectable.

However, when the already installed signal controller is replaced with the new signal controller, a replacement cost is required.

Therefore, a measure for acquiring signal information without obtaining an output from the already installed signal controller, and providing vehicles with the signal information has been demanded.

The present disclosure has been made in consideration of such circumstances, and an object of the present disclosure is to provide a technology capable of providing vehicles with signal information without obtaining an output from an already installed signal controller.

[Effects of the Present Disclosure]

According to the present disclosure, it is possible to provide vehicles with signal information, without obtaining an output from an already installed signal controller.

First, contents of embodiments are listed and described.

Outline of Embodiments (1) A signal information distribution system according to one embodiment is a system configured to distribute, to vehicles, signal information including a lighting start time and a lighting continuation interval of each of a plurality of signal lights of a signal light unit installed at an intersection, each signal light being configured to light in a predetermined color. The system includes: a storage unit configured to store therein a timing table including scheduled lighting intervals of the plurality of signal lights; a monitor unit configured to observe lighting and extinction of the plurality of signal lights; a generation unit configured to generate the signal information, based on an actual lighting interval, of a predetermined signal light among the plurality of signal lights, obtained from an observation result of the predetermined signal light, and on the scheduled lighting interval, of the predetermined signal light, included in the timing table; and a distribution unit configured to distribute, to the vehicles, the signal information generated by the generation unit.

According to the system of the above configuration, since the signal information generated by observing the actual light color of the signal light unit (lighting and extinction of the signal light) is distributed to the vehicles, the signal information can be acquired and distributed to the vehicles, without obtaining an output from an already installed signal controller (2) In the above signal information distribution system, preferably, the generation unit executes a time allocation process of setting the lighting start time of the predetermined signal light to a time at a starting time point of the actual lighting interval of the predetermined signal light, and sets the lighting continuation interval of the predetermined signal light to the scheduled lighting interval of the predetermined signal light to obtain the signal information.

In this case, the signal information can be generated with high accuracy by executing the time allocation process.

(3) In the above signal information distribution system, when a predetermined error occurs between the time at the starting time point of the actual lighting interval of the predetermined signal light after execution of the time allocation process, and the lighting start time of the predetermined signal light, the generation unit preferably corrects the lighting start time of the predetermined signal light to a time at a new starting time point of the actual lighting interval.

In this case, even when an error has occurred, with an elapse of time, between the time at the starting time point of the actual lighting interval of the predetermined signal light and the lighting start time of the predetermined signal light in the signal information, it is possible to eliminate the error and maintain the accuracy of the signal information.

(4) In the above signal information distribution system, preferably, when the actual lighting interval of the predetermined signal light does not conform to any of the scheduled lighting intervals included in the timing table, the distribution unit preferably does not distribute the signal information.

In this case, when the signal light unit performs an abnormal operation, inaccurate signal information that does not coincide with the operation of the signal light unit is prevented from being provided to the vehicles.

(5) In the above signal information distribution system, the timing table includes a timing table for normal use and a timing table for maintenance, and the distribution unit need not distribute the signal information when the actual lighting interval of the predetermined signal light conforms to the scheduled lighting interval included in the timing table for maintenance.

In this case, when the signal controller performs an operation for maintenance, inaccurate signal information that does not coincide with the operation of the signal light unit is prevented from being provided to the vehicles.

(6) In the above signal information distribution system, the timing table includes a first timing table and a second timing table whose use time slots are adjacent to each other, and the distribution unit preferably does not distribute the signal information at a timing when switching is made between the use time slot of the first timing table and the use time slot of the second timing table.

In this case, when switching is made between the use time slot of the first timing table and the use time slot of the second timing table, inaccurate signal information that does not coincide with the operation of the signal light unit is prevented from being provided to the vehicles.

(7) In the above signal information distribution system, the lighting start time is preferably represented by an absolute time.

In this case, the signal information is prevented from being adversely affected by a delay that occurs during distribution.

(8) A signal information distribution method according to another embodiment is a method for distributing, to vehicles, signal information including a lighting start time and a lighting continuation interval of each of a plurality of signal lights of a signal light unit installed at an intersection, each signal light being configured to light in a predetermined color. The method includes: causing a storage unit to store therein a timing table including scheduled lighting intervals of the plurality of signal lights; observing lighting and extinction of the plurality of signal lights; generating the signal information, based on an actual lighting interval, of a predetermined signal light among the plurality of signal lights, obtained from an observation result of the predetermined signal light, and on the scheduled lighting interval, of the predetermined signal light, included in the timing table; and distributing the signal information to the vehicles.

Details of Embodiments

Hereinafter, preferred embodiments will be described with reference to the drawings.

At least some pails of the embodiments described below may be combined as desired.

[Overall Configuration of Signal Information Distribution System]

FIG. 1 shows an example of a schematic configuration of a signal information distribution system according to one embodiment.

In FIG. 1, a signal information distribution system 1 is a system for distributing signal information of signal light units at intersections toward vehicles, and includes a plurality of light unit monitoring devices 2 and an information distribution device 4.

The plurality of light unit monitoring devices 2 and the information distribution device 4 are communicable with each other through, for example, a mobile communication system such as LIE (Long Term Evolution), and are able to exchange information when being communicatively connected to each other through the mobile communication system.

Figure 2:
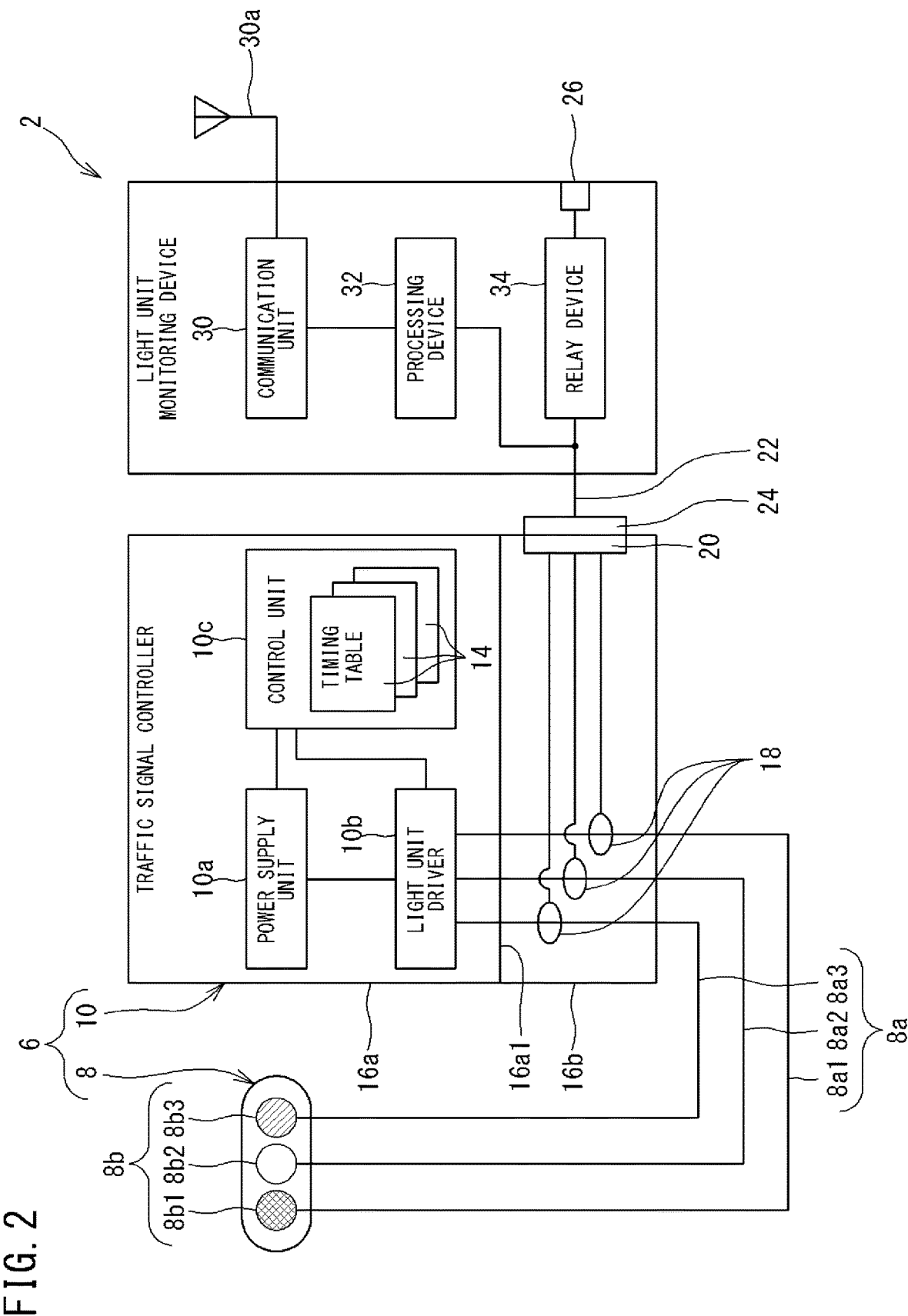
FIG. 2 shows examples of equipment configurations of a traffic signal unit and a light unit monitoring device.

Each light unit monitoring device 2 is installed adjacent to a traffic signal unit 6 within an installation area where the system 1 is installed, and monitors light colors of signal light units included in the traffic signal unit 6. The light unit monitoring device 2 may also be partially or entirely included in the traffic signal unit 6, instead of being installed outside the traffic signal unit 6 as shown in FIG. 2 described later.

The traffic signal unit 6 includes a plurality of signal light units 8, and a traffic signal controller 10 that controls the plurality of signal light units 8.

In FIG. 1, the light unit monitoring device 2 is installed adjacent to the traffic signal controller 10 included in the traffic signal unit 6 installed at an intersection J.

The traffic signal controller 10 supplies power to each signal light unit 8 through a signal line 8a connecting the traffic signal controller 10 to the signal light unit 8, and controls the light color of each signal light unit 8 by controlling lighting and extinction of each signal light unit 8.

Each signal line 8a is equipped with a sensor for detecting lighting and extinction of signal lights, of the signal light unit 8, corresponding to light colors. The sensor is connected to the light unit monitoring device 2. An output of the sensor is given to the light unit monitoring device 2. The sensor may be provided in a light unit driver 10b (described later) of the traffic signal controller 10.

The light unit monitoring device 2, by using the sensor, monitors lighting and extinction of each signal light unit 8 of the traffic signal unit 6.

The light unit monitoring device 2 gives signal information, of the signal light unit 8, which is obtained by monitoring the light color of the signal light unit 8, to the information distribution device 4 through wireless communication.

When the information distribution device 4 has a timing table (described later), the light unit monitoring device 2 gives a light unit state (timing information indicating lighting timing and extinction timing of each signal light unit 8) to the information distribution device 4 through wireless communication, as described later.

The information distribution device 4 collects signal information given from each light unit monitoring device 2 in the installation area, and stores the signal information therein. The information distribution device 4 distributes the collected signal information to the on-vehicle communication devices 12 mounted to vehicles V traveling in the installation area.

Each on-vehicle communication device 12 is able to perform communication through the mobile communication system, communicatively connects to the information distribution device 4 by using the mobile communication system, and exchanges information with the information distribution device 4.

Each vehicle V executes a process regarding safe driving support and a process regarding automated driving, based on the distributed information.

In this embodiment, an administrator (e.g., a prefectural public safety commission or a traffic administrator (e.g., police) delegated by the commission) managing the traffic signal unit 6 performs setting related to signal control, etc., for the traffic signal unit 6.

The signal information distribution system 1 of the present embodiment is managed by a business entity other than the administrator managing the traffic signal unit 6. That is, the administrator managing the traffic signal unit 6 is different from the administrator managing the signal information distribution system 1.

Therefore, the signal information distribution system 1 does not acquire control information for the signal light units 8 directly from the traffic signal controller 10, but monitors the signal light units 8 and indirectly acquires information regarding the signal light units 8. The system 1 generates signal information, based on the information obtained from the observation result and on a timing table, for the traffic signal unit 6, given from the administrator of the traffic signal unit 6 in advance, and distributes the signal information to the vehicles V.

FIG. 2 shows examples of equipment configurations of the traffic signal unit 6 and the light unit monitoring device 2.

The traffic signal controller 10 of the traffic signal unit 6 includes a power supply unit 10a, a light unit driver 10b, and a control unit 10c.

The power supply unit 10a is connected to, for example, a commercial power supply (not shown), and supplies power required in the traffic signal controller 10 to the components of the traffic signal controller 10.

The light unit driver 10b supplies the power given from the power supply unit 10a to signal lights 8b of each signal light unit 8 to drive the signal light unit 8.

The light unit driver 10b includes a plurality of semiconductor relays (not shown), and has a function of turning on and off the power supplied to the signal lights 8b of each signal light unit S.

A signal light 8b3, of the signal light unit 8, that emits red light is connected to the light unit driver 10b by a signal line 8a3. A signal light 8b2 that emits yellow light is connected to the light unit driver 10b by a signal line 8a2. A signal light 8bi that emits green light is connected to the light unit driver 10b by a signal line 8a1. Therefore, the respective signal lights 8b1, 8b2, and 8b3 are independently supplied with power from the light unit driver 10b.

For example, when the light color of the signal light unit 8 in FIG. 2 is red, since power is supplied to the signal light Sb1, a current flows in (a voltage is applied to) the signal line 8a1. Meanwhile, since no power is supplied to the signal lights 8b2 and 8b3, no current flows in (no voltage is applied to) the signal line 8a2 and the signal line 8a3.

Although only one signal light unit 8 is shown in FIG. 2, the signal lights 8b of each of the signal light units 8 included in the traffic signal unit 6 are connected to the light unit driver 10b as shown in FIG. 2. Therefore, the signal lines Sa connected to all the signal lights 8b included in the traffic signal unit 6 are extended from the light unit driver 10b.

The control unit 10c is implemented by a computer including a processing unit (not shown) such as a CPU (Central Processing Unit), and a storage unit (not shown) such as a memory or a hard disk. The storage unit stores therein a necessary program and information. The function of the control unit 10c (described later) is realized by the processing unit executing the program or the like.

The control unit 10c has the function of controlling the power supply unit 10a and the light unit driver 10b.

The storage unit of the control unit 10c stores therein a plurality of timing tables 14 (timing table). The plurality of timing tables 14 are information regarding a light color cycle of the signal light unit 8.

The control unit 10c controls the light unit driver 10b to control the light color of each signal light unit 8. The control unit 10c performs fixed-cycle control regarding the light color of each signal light unit 8 in accordance with the plurality of timing tables 14 which are signal control parameters.

FIG. 3 shows examples of timing tables 14. FIG. 3 shows a plurality of timing tables 14 (14a, 14b, 14c, 14d) stored in the storage unit.

As shown in FIG. 3, in each of the timing tables 14a to 14d, the continuation interval (lighting interval (seconds)) of each of the light colors of the signal light unit 8 is registered for each of a major road and a minor road. The "major road" is one of two roads intersecting with each other at an intersection, and the "minor road" is the other one of the roads intersecting at the intersection. For example, assuming that the road extending in the left-right direction, in the sheet of FIG. 1, at the intersection J is the major road, the road extending in the up-down direction in the sheet of FIG. 1 and intersecting the major road is the minor road.

For example, in the timing table 14a, the continuation interval of green (continuation interval in a first step) for the major road is registered to be 64 seconds, and the continuation interval of yellow (continuation interval in a second step) for the major road is registered to be 3 seconds. The continuation interval of red for the major road is registered to be 3 seconds in a third step, 54 seconds in a fourth step, 3 seconds in a fifth step, and 3 seconds in a sixth step.

Thus, scheduled lighting intervals of each light color in the light color cycle of the signal light unit 8 are registered in each timing table 14. In each timing table, information related to "time" is not included except for a use time slot thereof.

The "light color cycle" means a cyclic lighting pattern when the signal light unit 8 lights each color.

Among the plurality of timing tables 14, the timing tables 14a to 14c have different use time slots. The timing table 14a is used during a time slot from 7:00 to 17:00 in a day, the timing table 14b is used during a time slot from 17:00 to 21:00 in the day, and the timing table 14c is used during a time slot from 21:00 in the day to 7:00 in the following day.

The control unit 10c measures the present time by using a time measuring function thereof, and uses the timing tables 14a to 14c while switching them according to the present time. That is, the control unit 10c selects a timing table 14 to be used from among the timing tables 14a to 14c, and performs a control (multi-dial-coordinated control) of the light color of the signal light unit 8 by using the selected timing table 14. Thus, each signal light unit 8 operates in the light color cycle according to the timing table 14 selected by the control unit 10c.

Among the plurality of timing tables 14, the timing table 14d is a timing table for maintenance, and is used, for example, when abnormality occurs in the traffic signal controller 10 or when maintenance/inspection is performed.

When abnormality has been detected or switching to a maintenance/inspection mode has been made, the control unit 10c selects the timing table 14d and controls the signal light unit 8 by using the timing table 14d.

While the timing table 14d is a timing table for maintenance, the timing tables 14a to 14c to be used in a normal state are referred to as "timing tables for normal use"

As described above, signal control of the traffic signal unit 6 is performed by the administrator that manages the traffic signal unit 6. Therefore, the plurality of timing tables 14 are also managed by the administrator that manages the traffic signal unit 6.

Referring back to FIG. 2, a housing 16 of the traffic signal controller 10 includes a main housing 16a and a sub housing 16b.

The power supply unit 10a, the light unit driver 10b, and the control unit 10c described above are housed in the main housing 16a.

The sub housing 16b is fixed to one face 16a1 of the main housing 16a. The signal lines 8a are led out from the face 16a1, of the main housing 16a, to which the sub housing 16b is fixed. Thus, the signal lines 8a pass through the inside of the sub housing 16b to reach the signal light unit 8.

A plurality of sensors 18 for detecting power that flows in the signal lines 8a are provided inside the sub housing 16b.

Each sensor 18 is, for example, a clamp-type AC current sensor, and detects a current that flows in the corresponding signal line 8a while being out of contact with a conductor line of the signal line 8a.

Therefore, it is possible to detect, from an output of the sensor 18, whether the signal light 8b connected to the signal line 8a equipped with the sensor 18 is in a lighting state or in an extinction state. That is, the output of the sensor 18 indicates the state (operation) of the signal light 8b. This sensor 18 may be a CT (Current Transformer) sensor, for example.

The output of the sensor 18 is given to the light unit monitoring device 2. The light unit monitoring device 2 monitors (observes) the light color of the signal light unit 8, based on the output of the sensor 18.

Since the clamp-type AC current sensor detects a current that flows in the signal line Sa while being out of contact with the signal line 8a, even an interruption or a malfunction that may occur in the light unit monitoring device 2 will not adversely affect the traffic signal controller 10.

The sensor 18 may also be provided to some signal lines 8a selected from among all the signal lines Sa extending from the light unit driver 10b, instead of being provided to all the signal lines 8a extending from the light unit driver 10b. The sensor 18 may be provided inside (the main housing 16a of) the traffic signal controller 10, or inside the light unit driver 10b.

The light unit monitoring device 2 specifies a timing table 14 being used by the traffic signal controller 10 from among the plurality of timing tables 14, based on the output of the sensor 18 as described later.

When the sensor 18 is provided to only some of the signal lines 8a, the sensor 18 is provided to signal lines Sa from which information required by the light unit monitoring device 2 for specifying the timing table 14 being used, can be acquired.

The sensors 18 are connected to a connector 20 provided inside the sub housing 16b.

A connector 24, which is attached to an end of a connection line 22 extending from the light unit monitoring device 2, is detachably connected to the connector 20.

The outputs of the sensors 18 are given to a processing device or the like of the light unit monitoring device 2 through the connector 20, the connector 24, and the connection line 22.

The light unit monitoring device 2 includes the aforementioned sensors 18, a communication unit 30, a processing device 32, and a relay device 34.

The communication unit 30 has an antenna 30a, and is able to perform wireless communication conforming to the aforementioned mobile communication system. The communication unit 30 is communicatively connected to the information distribution device 4, based on control by the processing device 32.

The processing device 32 is implemented by a computer including a CPU, a storage unit, etc., and executes various processes for realizing the functions of the light unit monitoring device 2.

The connection line 22 is connected to the processing device 32. Therefore, the outputs of the sensors 18 given to the light unit monitoring device 2 through the connection line 22 are given to the processing device 32.

The processing device 32 executes the various processes, based on the outputs of the sensors 18.

Meanwhile, the connection line 22 is also connected to the relay device 34. In addition to the connection line 22, a connector 26 is connected to the relay device 34. The connector 26 is a connector for giving the outputs of the sensors 18 to a device other than the light unit monitoring device 2 including the connector 26.

The relay device 34 has a function of outputting, from the connector 26, the outputs of the sensors 18 given through the connection line 22, and relaying the outputs of the sensors 18 to the aforementioned other device.

Thus, the outputs of the sensors 18 can be given to the other device through the light unit monitoring device 2.

Figure 4:
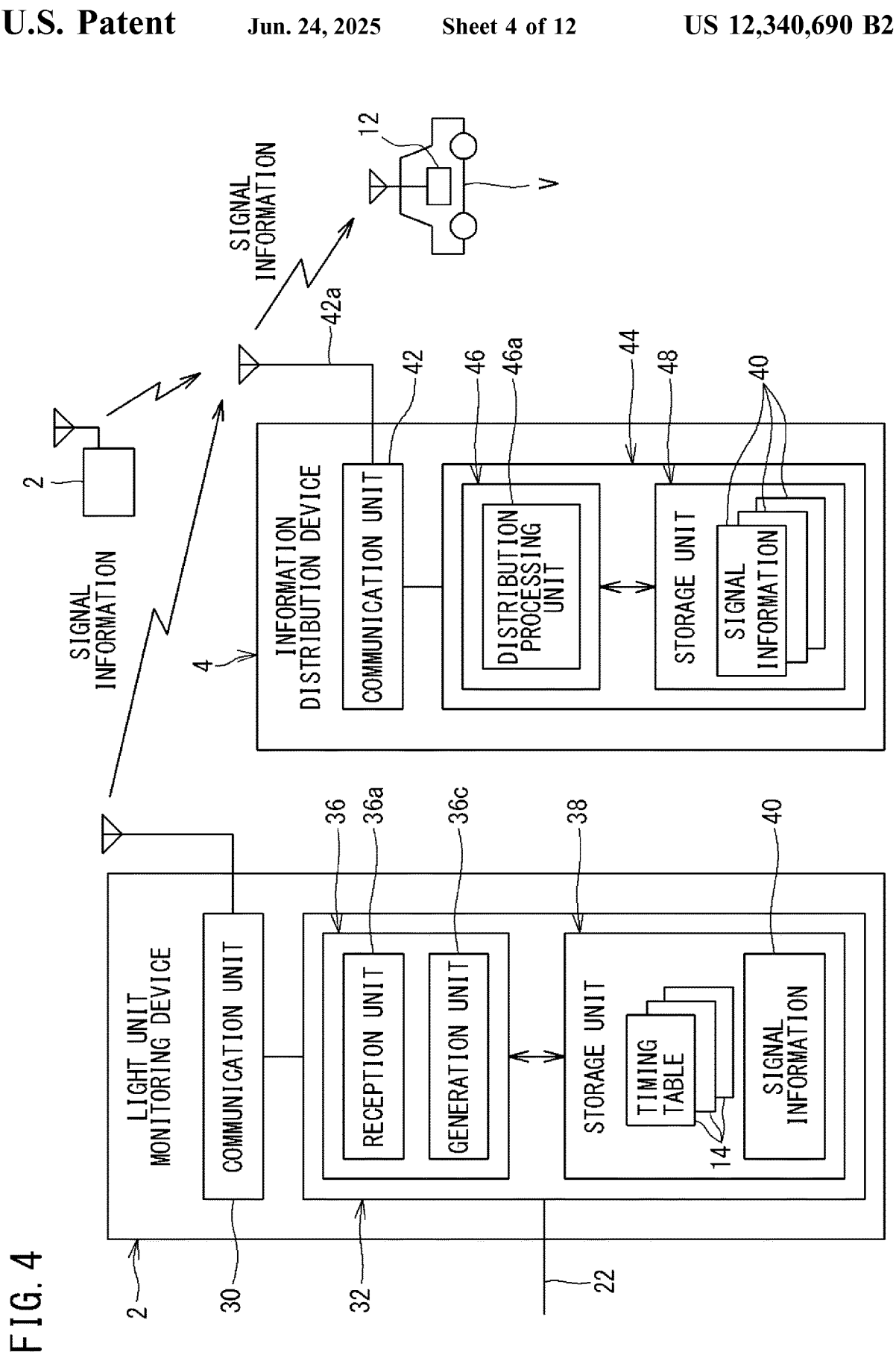
FIG. 4 is a block diagram showing examples of functions of a light unit monitoring device and an information distribution device according to a first embodiment.

Functions of Light Unit Monitoring Device and Information Distribution Device According to First Embodiment FIG. 4 is a block diagram showing examples of the functions of the light unit monitoring device 2 and the information distribution device 4 according to a first embodiment.

In FIG. 4, the light unit monitoring device 2 includes the communication unit 30 and the processing device 32 as described above. In FIG. 4, the relay device is not shown.

The processing device 32 is implemented by a computer including a processing unit 36 such as a CPU and a storage unit 38 such as a hard disk or a memory.

The storage unit 38 stores therein a program necessary for operation of the processing device 32, and various information. The function of the processing unit 36, described later, is realized by the processing unit 36 executing the program or the like.

The storage unit 38 of the present embodiment stores therein the same timing tables 14 as the plurality of timing tables 14 stored in the control unit 10c of the traffic signal controller 10. These timing tables 14 are given from the administrator of the traffic signal unit 6 to the administrator of the system 1 in advance. The administrator of the system 1 causes the storage unit 38 to store the given timing tables 14 therein.

The processing unit 36 functionally includes a reception unit 36a and a generation unit 36c.

The reception unit 36a receives an output given from a sensor 18, generates, based on the output, timing information indicating a lighting timing at which a predetermined signal light 8b (8b1, 8b2, 8b3) is lit and an extinction timing at which the signal light 8b is extinguished, and outputs the timing information as an observation result of the sensor 18.

That is, the sensor 18 is disposed outside (the main housing 16a of) the traffic signal controller 10, and detects a current that flows in the corresponding signal line 8a, thereby constituting a monitor unit that observes the actual light color of the signal light unit 8. The reception unit 36a outputs the output of the sensor 18 as an observation result of the light color of the signal light unit S.

The timing information may be a timing signal indicating a lighting timing or an extinction timing according to its output timing, or may be time information indicating the timing. Therefore, the timing information includes information indicating an observation lighting interval of the signal light 8b (8bi, 8b2, 8b3) of the signal light unit 8 (an actual lighting interval during which the to-be-observed signal light 8b has actually been lit consecutively).

The generation unit 36c has a function (collation process) of collating the observation result from the reception unit 36a with the plurality of timing tables 14 stored in the storage unit 38, and specifying a timing table 14 that conforms to the observation result.

In addition, the generation unit 36c has a function of generating signal information 40, based on the timing table 14 specified through the collation process and on the observation result from the reception unit 36a.

The signal information 40 is information including a light color start time of each light color of the signal light unit 8 (a lighting start time of each light color of the signal light unit 8), and a light color continuation interval (a lighting continuation interval of each light color of the signal light unit 8).

The light color start time is represented as an absolute time. The "absolute time" is a time represented by year, month, day, hour, minute, and second. In the following description, an absolute time is represented by hour, minute, and second, such as "10:00:00" or "10:00:00.0", while omitting year, month, and day.

FIG. 5 shows an example of the signal information 40.

As shown in FIG. 5, the signal information 40 includes a light color start time and a light color end time (a lighting end time) of each light color of the signal light unit 8 for each of a major road and a minor road.

In the signal information 40, a light color for each of the major road and the minor road is associated with a light color start time and a light color end time of the light color.

In the signal information 40, a light color continuation interval of each light color is indicated as the light color end time.

For example, it is registered, in the signal information 40 shown in FIG. 5, that the light color for the major road is green and the light color for the minor road is red during a period from 10:00:00 to 10:01:04.

This means that, when the light color for the minor road is red, the start time (light color start time) of a time slot during which the light color for the major road is green is 10:00:00, and the end time (light color end time) of the time slot during which the light color for the major road is green is 10:01:04.

In addition, it is registered that the light color for the major road is yellow and the light color for the minor road is red during a period from 10:01:04 to 10:01:07.

This means that, when the light color for the minor road is red, the start time of a time slot during which the light color for the major road is yellow is 10:01:04, and the end time of the time slot during which the light color for the major road is yellow is 10:01:07.

For example, the signal information 40 includes, for a few cycles, the light colors of the signal light unit 8 and the light color start time and the light color end time corresponding to each light color.

The generation unit 36c generates, at any time, signal information 40 including information in a period from the present time to a time a few cycles ahead or a period from the present time to a time a few minutes ahead.

Therefore, the signal information 40 includes information indicating the light colors for the major road and the minor road in a future period a few minutes ahead.

Referring back to FIG. 4, the processing device 32 stores the generated signal information 40 in the storage unit 38, and wirelessly transmits the signal information 40 to the information distribution device 4 through the communication unit 30.

When transmitting the signal information 40, the processing device 32 adds identification information indicating the light unit monitoring device 2 to the signal information 40. This identification information is information assigned to each of the light unit monitoring devices 2 in the installation area, and is used for identifying the light unit monitoring device 2. Any identification information, such as an IP address assigned to each light unit monitoring device 2, may be used as long as the light unit monitoring device 2 can be identified by the identification information.

The processing device 32 wirelessly transmits, to the information distribution device 4, an abnormality notification (described later), a switching prediction notification (described later), and a switching notification (described later) which are outputted from the generation unit 36c. The processing device 32 also adds the identification information indicating the light unit monitoring device 2 to each of the abnormality notification, the switching prediction notification, and the switching notification when transmitting the notification.

The information distribution device 4 includes a communication unit 42 having an antenna 42a, and a processing device 44.

The processing device 44 is implemented by a computer including a processing unit 46 such as a CPU, and a storage unit 48 such as a hard disk or a memory.

The storage unit 48 stores therein a program necessary for operation of the processing device 44, and various information. The function of the processing unit 46, described later, is realized by the processing unit 46 executing the program or the like.

The processing unit 46 functionally includes a distribution processing unit 46a.

The distribution processing unit 46a acquires signal information 40 transmitted from a light unit monitoring device 2 installed adjacent to each of a plurality of traffic signal units 6 in the installation area.

The distribution processing unit 46a causes the storage unit 48 to store the signal information from each light unit monitoring device 2, in association with the identification information.

In addition, in the storage unit 48, positional information of each light unit monitoring device 2 (traffic signal unit 6) is stored in association with the identification information.

The distribution processing unit 46a causes the storage unit 48 to store the received signal information 40, in association with the positional information and the identification information of the light unit monitoring device 2.

When being given new signal information 40 from a light unit monitoring device 2, the distribution processing unit 46a updates the signal information 40 having been stored, to the new signal information 40. Thus, the latest signal information 40 is stored in the storage unit 48.

The distribution processing unit 46a distributes the signal information 40 stored in the storage unit 48 to the on-vehicle communication devices 12 mounted to the vehicles V traveling in the installation area through wireless communication by the communication unit 42 (distribution process).

Upon receiving the distributed signal information 40, each vehicle V executes a process regarding safe driving support or a process regarding automated driving, based on the signal information 40.

The distribution processing unit 46a also has a function of executing a process of stopping distribution of the signal information 40 (distribution stop process) upon receiving an abnormality notification or a switching prediction notification from the light unit monitoring device 2.

[Collation Process]

Figure 6:
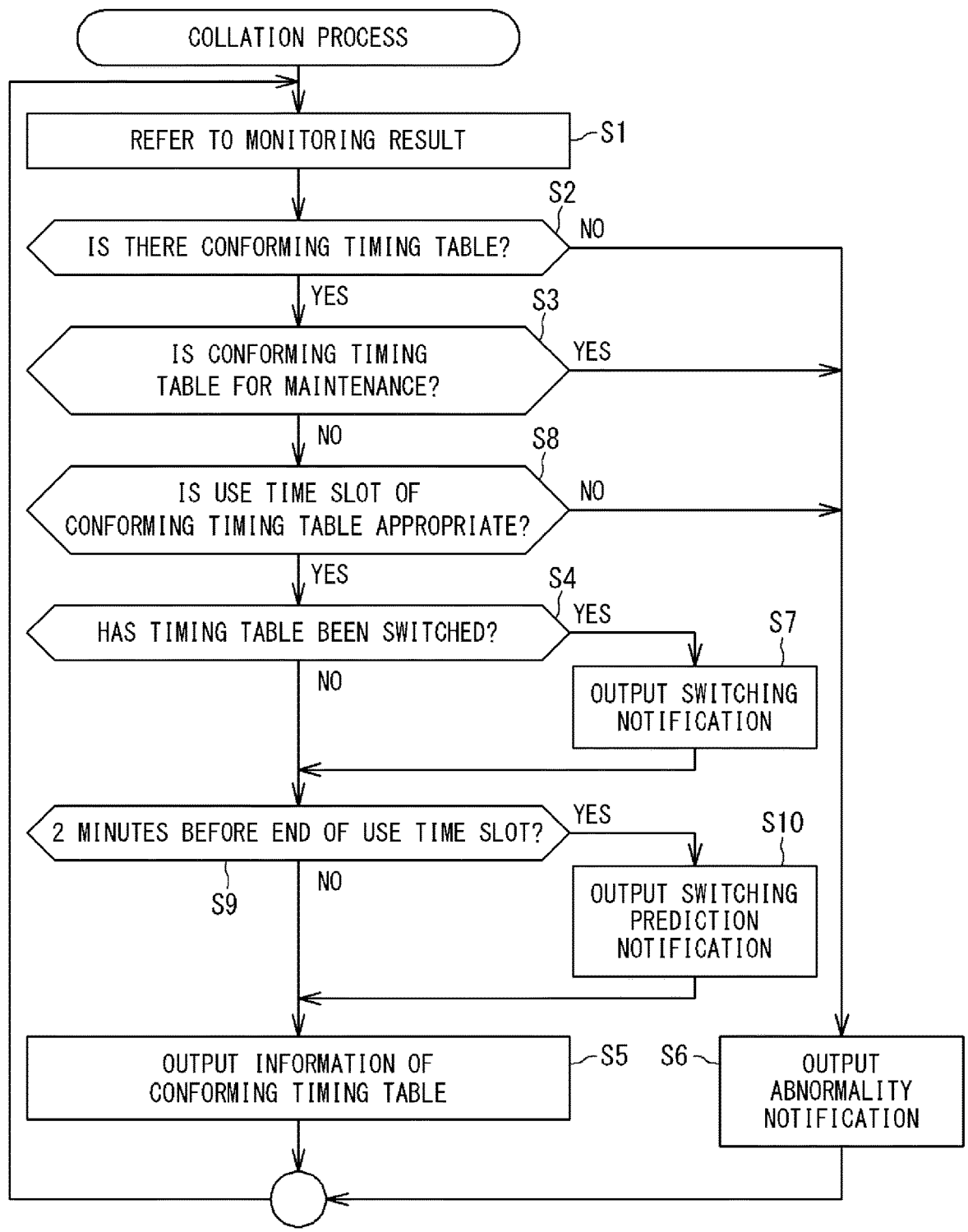
FIG. 6 is a flowchart showing an example of a collation process.

FIG. 6 is a flowchart showing an example of a collation process performed by the generation unit 36c.

Firstly, the generation unit 36c refers to an observation result outputted from the reception unit 36a (step S1).

Next, the generation unit 36c collates the observation result with the plurality of timing tables 14 stored in the storage unit 38, and determines whether or not there is a timing table 14 that conforms to the observation result (step S2).

The observation result from the reception unit 36a indicates an observation lighting interval (actual lighting interval) of the signal light 8b (8b1, 8b2, 8b3) of the signal light unit 8 of the traffic signal unit 6.

In each timing table 14, a scheduled lighting interval of each light color in the light color cycle is registered.

The generation unit 36c compares and collates the observation lighting interval of the signal light 8b indicated by the observation result with the scheduled lighting interval of the light color registered in each timing table 14, and specifies a timing table 14 that conforms to the observation result from among the plurality of timing tables 14.

The generation unit 36c need not use the observation results of all the signal lights 8b. The generation unit may select one or more observation results necessary for specifying a timing table 14 that conforms to the observation results (one or more observation results of one or more predetermined signal lights among the plurality of signal lights) from among the observation results of all the signal lights 8b to perform the collation process. When collation is performed using the selected observation results, only the signal light 8b (predetermined signal light 8b) corresponding to the selected observation results may be equipped with a sensor 18.

Upon determining in step S2 that there is a timing table 14 conforming to the observation result, the generation unit 36c proceeds to step S3 and determines whether or not this timing table is the timing table 14d for maintenance (step S3).

Upon determining in step S3 that the timing table 14 conforming to the observation result (hereinafter also referred to as "conforming timing table") is not the timing table 14*d* for maintenance but any of the timing tables 14*a* to 14*c* for normal use, the generation unit 36*c* determines whether or not the use time slot of the conforming timing table is appropriate in the light of the present time (step S8). Specifically, the generation unit 36*c* determines whether or not the present time is within the range of the use time slot of the conforming timing table.

Upon determining in step S8 that the use time slot of the conforming timing table is appropriate, the generation unit 36*c* proceeds to step S4 and determines whether or not the conforming timing table is a timing table having been switched from the preceding timing table 14 (the conforming timing table 14 in the last determination) (step S4).

Upon determining that the conforming timing table is not a timing table having been switched from the preceding timing table 14, the generation unit 36*c* proceeds to step S9.

On the other hand, upon determining in step S4 that the conforming timing table is a timing table having been switched from the preceding timing table 14, the generation unit 36*c* proceeds to step S7 and outputs a switching notification for notifying that the timing table 14 presently used is one having been switched (step S7). Thereafter, the generation unit 36*c* proceeds to step S9.

The switching notification outputted from the generation unit 36*c* is transmitted to the information distribution device 4 through the communication unit 30.

This switching notification is a notification notifying that the timing table 14 being used by the traffic signal controller 10 has been switched.

In step S9, the generation unit 36*c* determines whether or not the present time is past a time two minutes before the end time of the use time slot of the conforming timing table (step S9).

Upon determining in step S9 that the present time is not past the time two minutes before the end time of the use time slot of the conforming timing table, the generation unit 36*c* proceeds to step S5.

On the other hand, upon determining in step S9 that the present time is past the time two minutes before the end time of the use time slot of the conforming timing table, the generation unit 36*c* outputs a switching prediction notification for predicting switching of the timing table 14 presently used (step S10), and proceeds to step S5.

The switching prediction notification outputted from the generation unit 36*c* is transmitted to the information distribution device 4 through the communication unit 30. The switching prediction notification is transmitted so as to be received by the information distribution device 4 before switching of the conforming timing table to the timing table 14 corresponding to the next use time slot.

The switching prediction notification allows the information distribution device 4 to be notified that the timing table 14 presently used will be switched within two minutes.

In step S5, the generation unit 36*c* outputs information indicating the conforming timing table (step S5), and returns to step S1.

The conforming timing table is the timing table 14 presently used by the traffic signal controller 10.

The collation process allows the generation unit 36*c* to specify the timing table 14 presently used by the traffic signal controller 10.

Upon determining in step S2 that there is no timing table conforming to the observation result, the generation unit 36*c* proceeds to step S6, outputs an abnormality notification (step S6), and returns to step S1.

When there is no timing table conforming to the observation result, there is a possibility that the traffic signal unit 6 performs an abnormal operation. Therefore, the generation unit 36*c* outputs the abnormality notification upon determining that there is no conforming timing table.

Upon determining in step S3 that the conforming timing table is the timing table 14*d* for maintenance, the generation unit 36*c* proceeds to step S6, outputs an abnormality notification (step S6), and returns to step S1.

When the conforming timing table is the timing table for maintenance, the traffic signal controller 10 controls the signal light unit 8 to be in the light color cycle for maintenance. The traffic signal controller 10 performs the above control when the traffic signal controller 10 has detected abnormality in itself or the signal light unit 8 or when the traffic signal controller 10 has been switched into a maintenance/inspection mode. Therefore, the generation unit 36*c* outputs the abnormality notification upon determining that the conforming timing table is the timing table for maintenance.

Upon determining in step S8 that the use time slot of the conforming timing table is not appropriate, the generation unit 36*c* proceeds to step S6, outputs an abnormality notification (step S6), and returns to step S1.

For example, when a timing table 14 whose use time slot does not include the present time is used, there is a possibility that the traffic signal unit 6 performs an abnormal operation. Therefore, the generation unit 36*c* outputs an abnormality notification upon determining that the use time slot of the conforming timing table is not appropriate in light of the present time.

The abnormality notification outputted from the generation unit 36C is transmitted to the information distribution device 4 through the communication unit 30.

As described above, the generation unit 36*c* outputs an abnormality notification when the conforming timing table is the timing table 14*d* for maintenance or when there is no conforming timing table.

That is, the generation unit 36*c* sequentially collates the observation result with the plurality of timing tables 14, and detects abnormality that occurs in the traffic signal controller 10.

[Generation of Signal Information]

Figure 7:
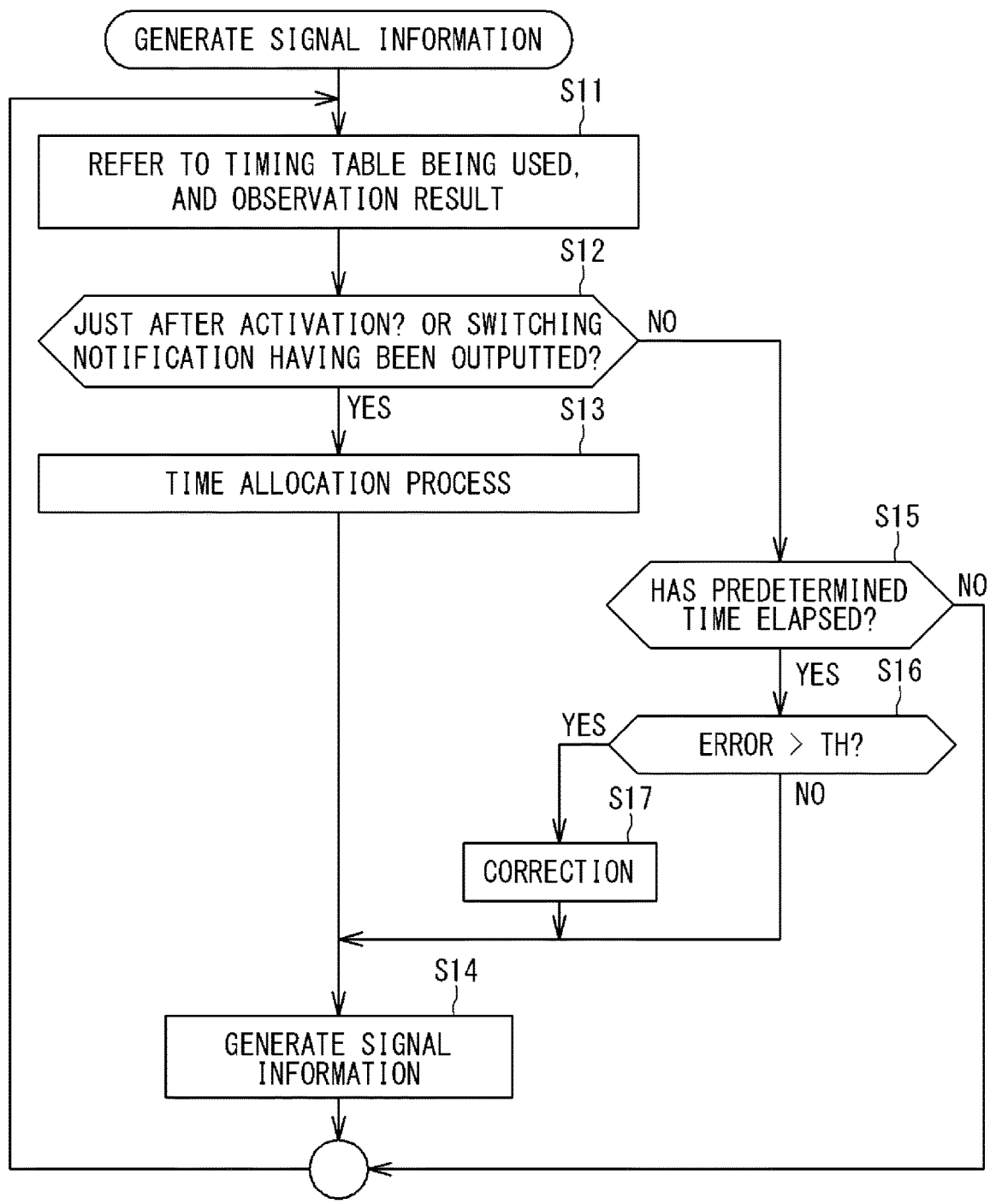
FIG. 7 is a flowchart showing an example of a process for generating signal information.

FIG. 7 is a flowchart showing an example of a process of generating signal information, performed by the generation unit 36*c*.

In FIG. 7, firstly, the generation unit 36*c* refers to the timing table 14 that has been specified in the collation process and is presently used by the traffic signal controller 10, and refers to the observation result of the reception unit 36*a* (step S11).

Next, the generation unit 36*c* determines whether or not the light unit monitoring device 2 has just been activated, or whether or not a switching notification has been outputted in the collation process (step S12).

When the determination result is that the light unit monitoring device 2 has just been activated or that a switching notification has been outputted in the collation process, the generation unit 36*c* executes a time allocation process (step S13).

The time allocation process is a process of allocating times based on the observation result, as a light color start time and a light color end time to be included in the signal information 40.

When the light unit monitoring device 2 has just been activated, a time based on an observation result is not allocated in the signal information 40. When a switching notification has been given, this notification indicates that the timing table 14 used by the traffic signal controller 10 has been switched. Also in this case, a time based on an observation result is not allocated in the signal information 40.

Therefore, when the determination result is that the light unit monitoring device 2 has just been activated or that a switching notification has been given, the generation unit 36c executes the time allocation process.

Figure 8:
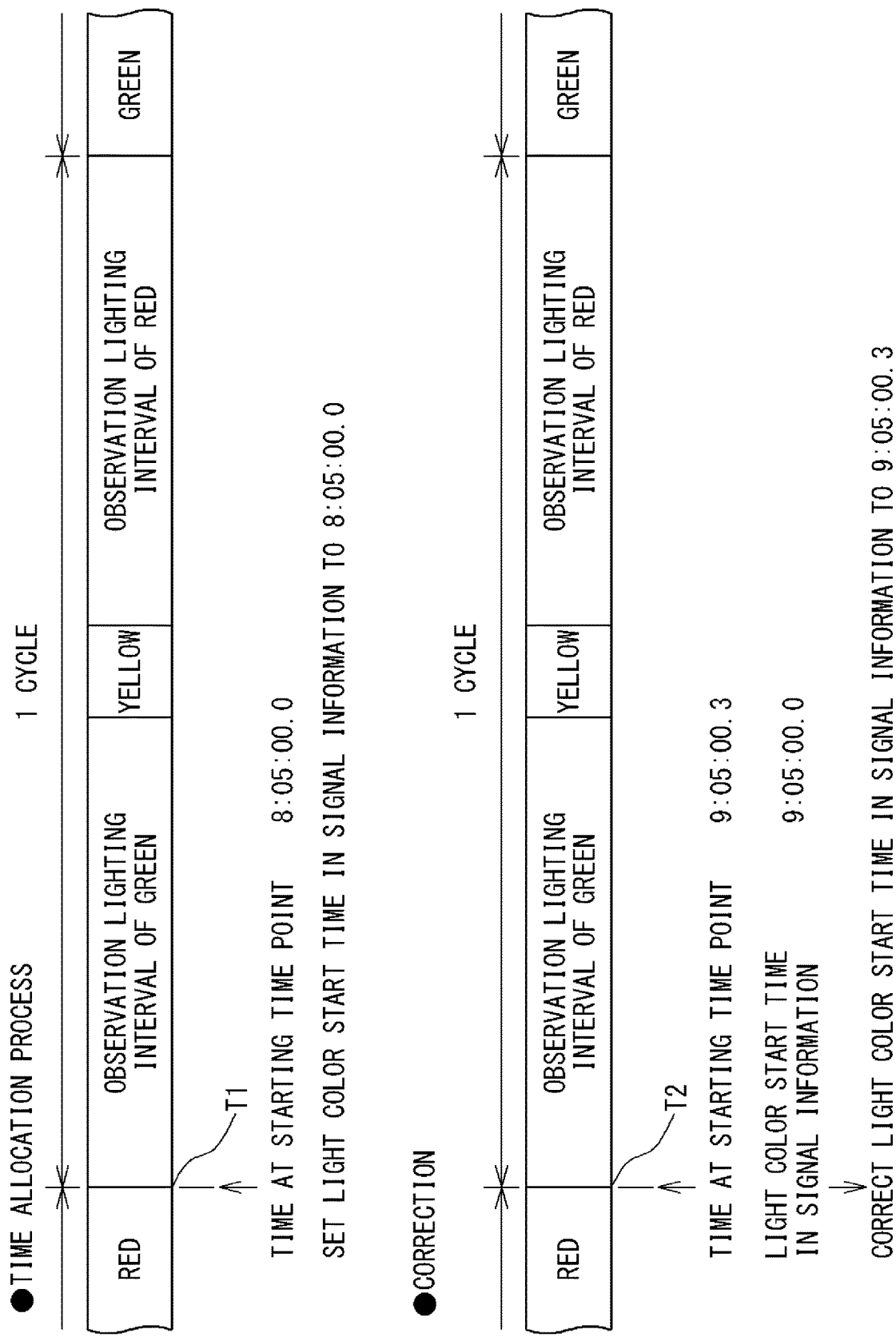
FIG. 8 illustrates a time allocation process.

FIG. 8 illustrates the time allocation process. FIG. 8 shows observation lighting intervals of the respective light colors in the light color cycle for the major road, obtained from the observation result.

As shown in the tipper stage in FIG. 8, for example, the generation unit 36c, based on the observation result, grasps the time at a starting time point T1 of an observation lighting interval of green, and sets the light color start time of green in the signal information 40 to the time at the starting time point T1.

In the tipper stage in FIG. 8, assuming that the time at the starting time point T1 based on the observation result is 8:05:00.0 (a numerical value that follows "00." indicates a time in 1/10 seconds; the same applies hereinafter), the generation unit 36c sets the light color start time of green in the signal information 40 to 8:05:00.0.

Thus, the generation unit 36c performs a process (time allocation process) of setting the light color start time of a predetermined signal light color (the lighting start time of the predetermined signal light) in the signal information 40, to the time at the starting time point of the observation lighting interval of the predetermined signal light color (the actual lighting interval of the predetermined signal light) obtained from the observation result.

The processing device 32 has a function of measuring time with high accuracy by using a synchronization function of the mobile communication system, and measures time and sets a reference time by using the time measuring function.

When being equipped with a GPS (Global Positioning System) receiver, the processing device 32 may measure time by using an 1PPS signal. Also in this case, highly accurate measurement of time is achieved.

After executing the time allocation process in step S13 in FIG. 7, the generation unit 36c proceeds to step S14 and generates signal information 40 (step S14).

Using as a reference the time at the starting time point T1, the generation unit 36c generates signal information 40 on and after the time at the starting time point T1, based on the scheduled lighting interval of each light color registered in the timing table 14.

That is, the generation unit 36c obtains the light color start time and the light color end time (light color continuation interval) included in the signal information 40 on and after the time at the starting time point T1, based on the time of the starting time point T1 and on the scheduled lighting interval of each light color registered in the timing table 14.

The generation unit 36c refers to the sane timing table 14 presently used by the traffic signal controller 10. Since the timing table 14 includes the scheduled lighting interval of each light color, it is possible to obtain the light color start time and the light color end time in the future of each light color in the signal information 40, based on the time at the starting time point T1.

Thus, the generation unit 36c generates signal information 40 corresponding to a period from the present time to a time a few cycles ahead or a period from the present time to a time a few minutes ahead.

As described above, the generation unit 36c can accurately generate the signal information 40 by performing a process of setting the light color start time of green in the signal information 40 to the time at the starting time point T1 of the observation lighting interval of green.

The processing device 32 transmits the signal information 40 generated by the generation unit 36c to the information distribution device 4.

In FIG. 7, after generation of the signal information 40 in step S14, the generation unit 36c returns to step S11.

When it has been determined in step S12 that the light unit monitoring device 2 is not in the state just after activation and a switching notification was not outputted in the collation process, the generation unit 36c proceeds to step S15 and determines whether or not a predetermined time has elapsed (step S15). Upon determining that the predetermined time has not elapsed, the generation unit 36c returns to step S11.

On the other hand, upon determining in step S15 that the predetermined time has elapsed, the generation unit 36c obtains an error between the time at the starting time point T2 of the observation lighting interval (the time obtained from the observation result) of green when the predetermined time has elapsed, and the light color start time (the time obtained based on the time at the starting time point T1) of green in the signal information 40, and determines whether or not this error is greater than a predetermined threshold value Th (step S16).

The lower stage in FIG. 8 shows observation lighting intervals of the respective light colors in the light color cycle for the major road, obtained from the observation result when the predetermined time has elapsed after execution of the time allocation process by the generation unit 36c.

The generation unit 36c, after execution of the time allocation process, acquires the time (absolute time) at the starting time point T2 of the observation lighting interval of green when the predetermined time has elapsed.

Furthermore, the generation unit 36c compares the time at the starting time point T2 of the observation lighting interval of green with the light color start time of green in the signal information 40, and obtains an error between them.

This error may be obtained when the predetermined time has elapsed, or may be obtained for each light color cycle.

For example, as shown in the lower stage in FIG. 8, when the time at the starting time point T2 of the observation lighting interval of green is 9:05:00.3 while the light color start time of green in the signal information 40 is 9:05:00.0, this means that the actual light color cycle of the signal light unit 8 is delayed by 0.3 seconds from the time indicated by the signal information 40.

In this case, the generation unit 36c obtains an error (0.3 seconds) between the times, and determines whether or not this error is greater than the predetermined threshold value Th (step S16).

The actual time in the light color cycle obtained from the observation result depends on the accuracy of the time measuring function of the traffic signal controller 10. The traffic signal controller 10 is not always equipped with a time measuring function capable of keeping high accuracy, such as a GPS or a radio-controlled clock. For example, there are cases where the traffic signal controller 10 measures time by using the commercial power supply being 50 Hz or 60 Hz, which may result in accumulated errors. Therefore, a time offset is likely to occur between the actual time in the light color cycle obtained from the observation result, and the light color start time and the light color end time obtained by the generation unit 36c, which may cause an error with the elapse of time.

For example, assuming that the threshold value Th is 0.2 seconds in the present embodiment, as shown in the lower stage in FIG. 8, the generation unit 36c determines that the error is greater than the predetermined threshold value Th, proceeds to step S17, and corrects (amends) the light color start time in the signal information 40 to the time at the new starting time point T2 (step S17).

As shown in the lower stage in FIG. 8, the generation unit 36c corrects the light color start time of green in the signal information 40 to the time at the starting time point T2. That is, in the lower stage in FIG. 8, the generation unit 36c sets the light color start time of green in the signal information 40 to 9 05:00.3.

Thus, even when an error has occurred, with the elapse of time, between the starting time point of the observation lighting interval and the scheduled light color start time in the signal information 40, the generation unit 36c can eliminate this error and maintain the time accuracy of the signal information 40.

In step S17 in FIG. 7, the generation unit 36c corrects the light color start time in the signal information 40 to the time at the new starting time point, and proceeds to step S14 to generate signal information 40.

After generation of the signal information 40 in step S14, the generation unit 36c returns to step S11.

Upon determining in step S16 that the error is not greater than the threshold value Th, the generation unit 36c proceeds to step S14 and generates signal information 40.

After generation of the signal information 40 in step S14, the generation unit 36c returns to step S11.

As described above, when the light unit monitoring device 2 is not in the state just after activation and a switching notification was not outputted in the collation process, the generation unit 36c obtains, for each elapse of the predetermined time, an error between the time (the lighting start time of a predetermined signal light) included in the signal information 40, and the actual time (the time at the starting time point of the actual lighting interval of the predetermined signal light) indicating the light color cycle obtained from the observation result. Then, according to the error, the generation unit 36c corrects the light color start time in the signal information 40 to the time at the new starting time point.

When the light unit monitoring device 2 is not in the state just after activation and a switching notification was not outputted in the collation process, the generation unit 36c generates signal information 40 for each elapse of the predetermined time.

The predetermined time is set to be shorter than the length of a time period (a period from the present time to a time a few cycles ahead or a period from the present time to a time a few minutes ahead) included in the signal information 40 generated by the generation unit 36c.

[Distribution Process]

Figure 9:
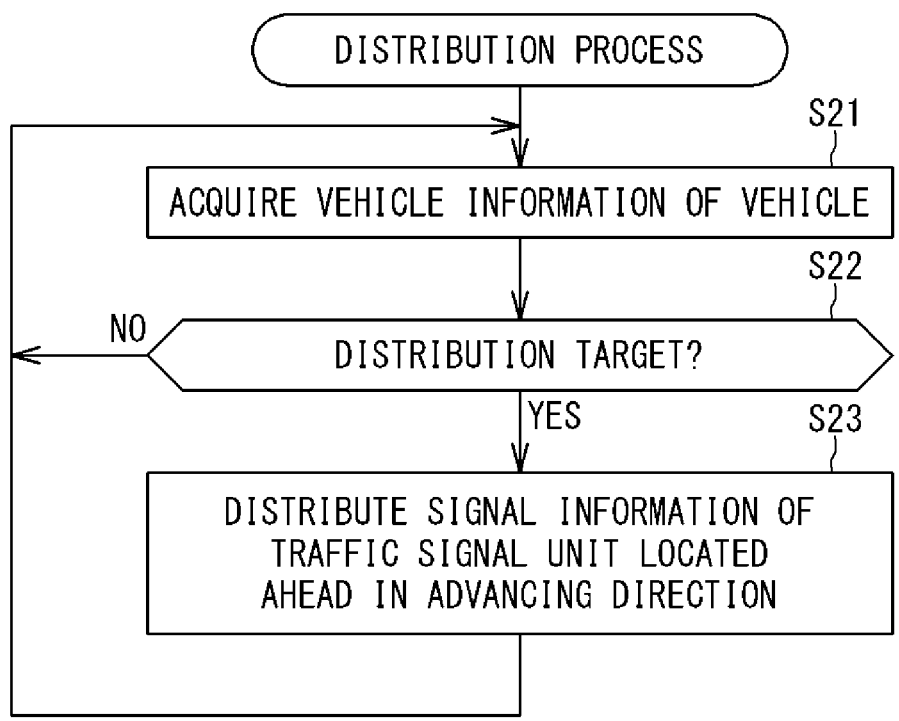
FIG. 9 is a flowchart showing an example of a distribution process performed by a distribution processing unit of the information distribution device.

FIG. 9 is a flowchart showing an example of a distribution process performed by the distribution processing unit 46a in the information distribution device 4.

The distribution processing unit 46a receives and acquires vehicle information transmitted from a vehicle V (on-vehicle communication device 12) toward the information distribution device 4 (step S21).

The on-vehicle communication device 12 of the vehicle V is communicatively connected to the information distribution device 4, and transmits, at any time, the vehicle information including positional information, speed information, a heading direction, etc., of the vehicle.

Based on the acquired vehicle information of the vehicle V, the distribution processing unit 46a determines whether or not the vehicle V is a distribution target to which signal information 40 is to be distributed (step S22).

The distribution processing unit 46a determines that the vehicle V is a distribution target when the positional information of the vehicle V is determined to be within the installation area, and determines that the vehicle V is not a distribution target when the positional information of the vehicle V is determined to be outside the installation area.

Upon determining that the vehicle V is not a distribution target of the signal information 40, the distribution processing unit 46a returns to step S21 again and repeats steps S21 and S22.

Upon determining that the vehicle V is a distribution target of the signal information 40, the distribution processing unit 46a proceeds to step S23 and specifies an intersection (light unit monitoring device 2) located ahead in the advancing direction of the vehicle V, based on the vehicle information of the vehicle V and on the positional information, of the light unit monitoring device 2, stored in the storage unit 48. The distribution processing unit 46a distributes, toward the vehicle V, the signal information 40 of the traffic signal unit 6 (light unit monitoring device 2) located ahead in the traveling direction of the vehicle V (step S23).

The distribution processing unit 46a performs the distribution process for each of the vehicles V communicatively connected thereto.

Thus, the distribution processing unit 46a can distribute appropriate signal information 40 to each of the vehicles V traveling in the installation area.

According to the system 1 of the present embodiment, the signal information 40 generated by observing the actual light color (lighting and extinction of the signal light) of each signal light unit 8 of the traffic signal unit 6 is distributed to the vehicles V, the signal information 40 can be acquired without obtaining an output from the already installed traffic signal controller 10 and distributed to the vehicles V.

The light color start time (lighting start time) and the light color end time of each light color included in the signal information 40 of the present embodiment are represented by absolute times.

For example, when signal information 40 in which a light color start time and a light color end time are represented by relative times is distributed, an error is likely to occur in the signal information 40 due to influence of a delay caused by the time required for communication.

Meanwhile, in the present embodiment, since the light color start time and the light color end time of each light color included in the signal information 40 are represented by absolute times, the signal information 40 is prevented from being adversely affected by a delay that occurs during distribution. As a result, highly accurate times can be provided to the vehicles V

[Distribution Stop Process]

Figure 10:
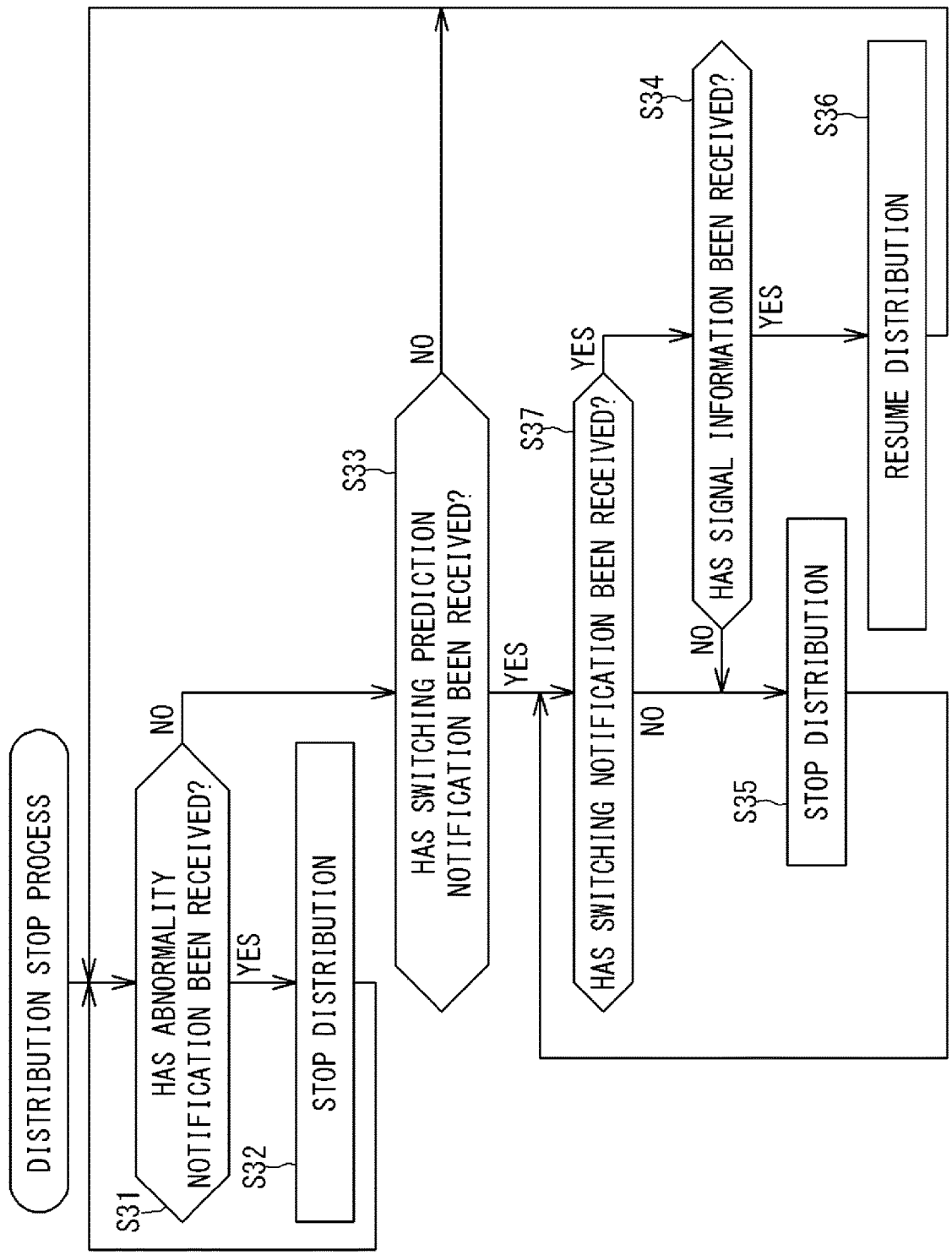
FIG. 10 shows an example of a distribution stop process performed by a distribution processing unit of the information distribution device.

FIG. 10 shows an example of a distribution stop process performed by the distribution processing unit 46a in the information distribution device 4.

Firstly, the distribution processing unit 46a determines whether or not an abnormality notification from the light unit monitoring device 2 has been received (step S31).

Upon determining in step S31 that an abnormality notification has been received, the distribution processing unit 46a proceeds to step S32, specifies a light unit monitoring device 2 as a transmission source of the abnormality notification, based on identification information added to the abnormality notification, stops or does not perform distribution of the signal information 40 of the abnormality notification transmission source (step S32), and returns to step S31 again.

When the abnormality notification has been received, the light unit monitoring device 2 as the transmission source of the abnormality notification determines that operation of the traffic signal controller 10 (signal light unit 8) is abnormal because there is no timing table 14 that conforms to the observation result or a conforming timing table 14 is a timing table for maintenance.

In the system 1 of the present embodiment, since distribution of the signal information 40 is not performed when the signal light unit 8 abnormally operates or performs an operation for maintenance, it is possible to prevent inaccurate signal information 40 that does not coincide with the operation of the signal light unit 8 from being provided to the vehicles V.

Upon determining in step S31 that no abnormality notification has been received, the distribution processing unit 46a proceeds to step S33 and determines whether or not a switching prediction notification from the light unit monitoring device 2 has been received (step S33).

Upon determining in step S33 that no switching prediction notification has been received, the distribution processing unit 46a returns to step S31.

On the other hand, upon determining in step S33 that a switching prediction notification has been received, the distribution processing unit 46a proceeds to step S37, specifies a light unit monitoring device 2 as a transmission source of the switching prediction notification, based on identification information added to the switching prediction notification, and determines whether or not a switching notification from the switching prediction notification transmission source has been received after reception of the switching prediction notification (step S37).

Upon determining in step S37 that no switching notification has been received, the distribution processing unit 46a proceeds to step S35, stops or does not perform distribution of the signal information 40 of the switching prediction notification transmission source (step S35), and returns to step S37 again.

Upon determining in step S37 that a switching notification has been received, the distribution processing unit 46a proceeds to step S34, and determines whether or not the signal information 40 from the transmission source of the switching prediction notification (and the switching notification) has been received after reception of the switching notification (step S34).

Upon determining that the signal information 40 from the switching prediction notification transmission source has not been received, the distribution processing unit 46a proceeds to step S35, stops or does not perform distribution of the signal information 40 of the switching prediction notification transmission source (step S35), and returns to step S37 again.

Therefore, after reception of the switching prediction notification, the distribution processing unit 46a repeatedly executes steps S37, S34, and S35 until receiving a switching notification and signal information 40 from the transmission source of the switching prediction notification.

Upon determining in step S34 that the signal information 40 from the switching prediction notification transmission source has been received, the distribution processing unit 46a proceeds to step S36, resumes distribution of the signal information 40 of the switching prediction notification transmission source, and returns to step S31.

When the switching prediction notification has been received, the light unit monitoring device 2 of the transmission source of the switching prediction notification determines that the present time is past a time two minutes before the end time of the use time slot of the timing table 14 (conforming timing table) presently used.

When the timing table 14 used by the traffic signal controller 10 has been switched, there is a possibility that the light color start time and the light color end time in the signal information 40 generated before the switching do not coincide with the times in the actual light color cycle after the switching.

Even though the timing table 14 used by the traffic signal controller 10 has been switched, if the information distribution device 4 distributes the signal information 40 generated before the switching, there is a possibility that inaccurate information is transmitted.

In this regard, in the system 1 of the present embodiment, when the information distribution device 4 has received a switching prediction notification that predicts switching of the timing table 14 used by the traffic signal controller 10, the information distribution device 4 stops distribution of the signal information 40 of the transmission source of the switching prediction notification.

That is, as for two timing tables 14 whose use time slots are adjacent to each other, distribution of the signal information 40 of the transmission source of the switching prediction notification is not performed at a timing when switching is made between the use time slot of one timing table 14 and the use time slot of the other timing table 14. Therefore, even when the signal information 40 previously generated becomes non-coincident with the time in the light color cycle after the switching because of the switching of the timing table 14 used by the traffic signal controller 10, it is possible to prevent signal information 40 non-coincident with the operation of the signal light unit 8 from being provided to the vehicles V.

The case where the use time slots of two timing tables are adjacent to each other includes: a case where the two timing tables 14 are set on a day-of-the-week basis and therefore days of the week are adjacent to each other; and a case where the two timing tables 14 are set on a day-to-day basis and therefore days are adjacent to each other.

When signal information 40 has been given after reception of a switching prediction notification and a switching notification, this signal information 40 is signal information 40 generated after switching of the timing table 14. This signal information 40 is generated based on the timing table 14 presently used by the traffic signal unit 6.

Therefore, when distribution has been resumed, the distribution processing unit 46a can distribute the appropriate signal information 40 generated based on the timing table 14 presently used by the traffic signal unit 6.

In the present embodiment, the timing at which switching is made between the use time slot of one of two timing tables 14 and the use time slot of the other timing table 14 corresponds to a time period in which distribution of signal information 40 by the distribution processing unit 46a is not performed, i.e., a time period from when the distribution processing unit 46a receives a switching prediction notification to when the distribution processing unit 46a receives signal information 40 after reception of a switching notification.

Figure 11:
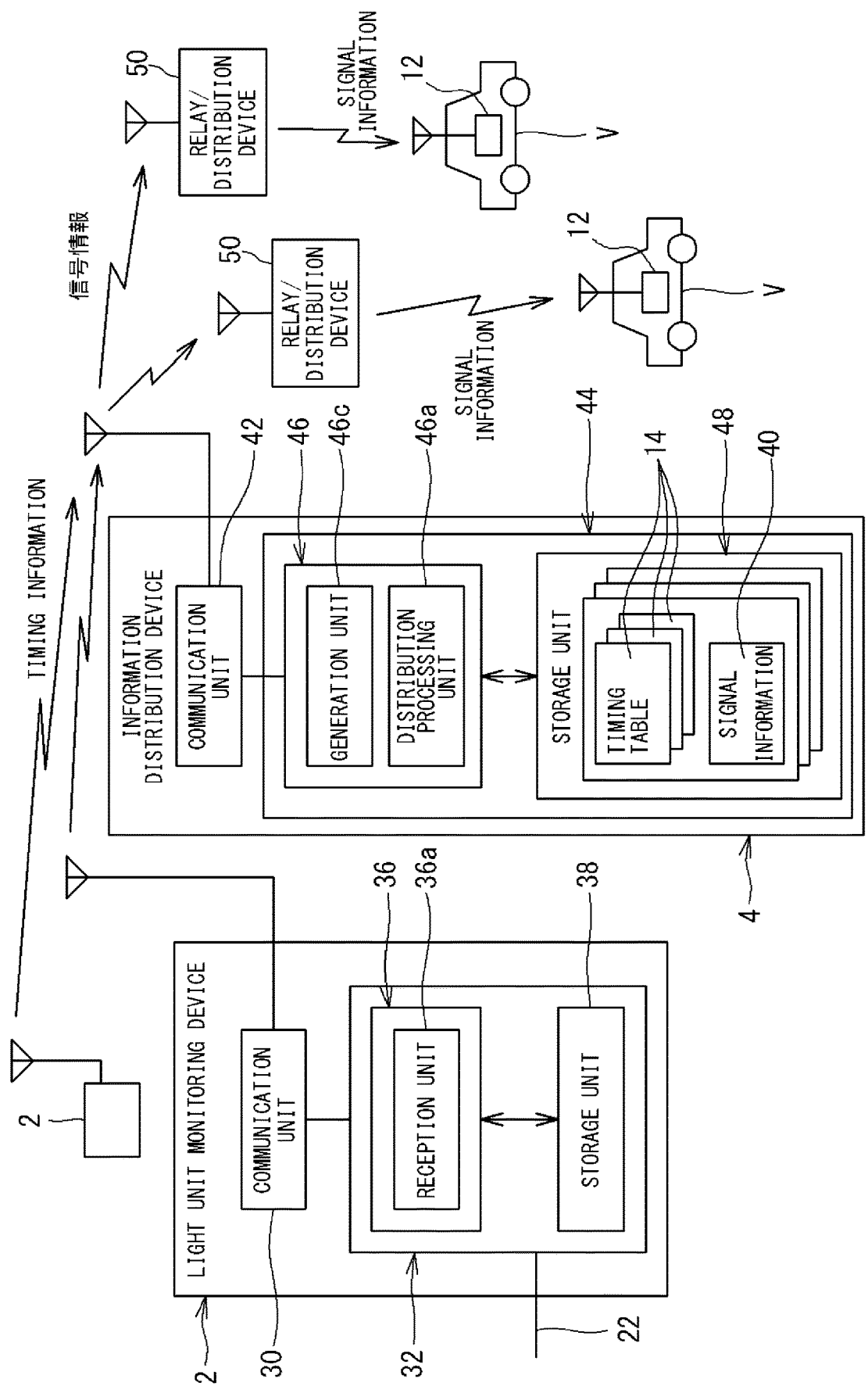
FIG. 11 is a block diagram showing examples of functions of a light unit monitoring device and an information distribution device according a second embodiment.

Functions of Light Unit Monitoring Device and
Information Distribution Device According to Other
Embodiments FIG. 11 is a block diagram showing examples of the functions of the light unit monitoring device 2 and the information distribution device 4 according to a second embodiment.

The present embodiment is different from the first embodiment in the following points. That is, the processing device 44 in the information distribution device 4 includes a generation unit 46c in addition to the distribution processing unit 46a. The light unit monitoring device 2 includes a sensor 18 (no shown) and a reception unit 36a. The information distribution device 4 distributes signal information 40 to vehicles V via relay/distribution devices 50.

As described above, the sensor 18 of the light unit monitoring device 2 monitors a lighting timing at which a signal light 8b is lit and an extinction timing at which the signal light 8b is extinguished, and the reception unit 36a outputs, as an observation result of the sensor 18, timing information indicating the lighting timing and the extinction timing.

The processing device 32 of the light unit monitoring device 2 transmits the observation result of the reception unit 36a toward the information distribution device 4.

Upon receiving the observation result from the light unit monitoring device 2, the generation unit 46c of the information distribution device 4 generates signal information 40.

The generation unit 46c of the present embodiment performs a process of generating signal information 40 for each of the light unit monitoring devices 2 communicatively connected to the information distribution device 4.

Therefore, the storage unit 48 stores therein information corresponding to each of the light unit monitoring devices 2 in the installation area.

The storage unit 48 stores therein, as the information corresponding to each light unit monitoring device 2, a plurality of timing tables 14 and the signal information 40 generated by the generation unit 46c.

The process performed by the generation unit 46c of the present embodiment is identical to that of the first embodiment.

The information distribution device 4 distributes the signal information 40 to the vehicles V via the relay/distribution devices 50.

For example, (the on-vehicle communication devices 12 of) the respective vehicles V may be communicatively connected to only communication devices that belong to different business entities. In this case, the relay/distribution devices 50 that belong to the respective business entities are provided, and the information distribution device 4 transmits the signal information 40 via the relay/distribution devices 50.

Thus, even when the vehicles V are communicatively connected to only the communication devices that belong to the different business entities, the system of the present embodiment can distribute the signal information 40 to the respective vehicles V.

In the present embodiment, as in the first embodiment, the signal information 40 can be distributed to the vehicles V without obtaining an output from the already installed traffic signal controller 10.

FIG. 12 is a block diagram showing an example of the function of the light unit monitoring device 2 according to a third embodiment.

This embodiment is different from the first embodiment in the following points. That is, the processing device 32 of the light unit monitoring device 2 includes a distribution processing unit 36d in addition to the reception unit 36a and the generation unit 36c. The light unit monitoring device 2 distributes signal information 40 to the vehicles V without an intervention of the information distribution device 4.

Therefore, the distribution processing unit 36d of the present embodiment distributes only the signal information 40 of the traffic signal unit 6 observed by the light unit monitoring device 2.

Therefore, the distribution processing unit 36d distributes the signal information 40 to the vehicles, as distribution targets, traveling in a predetermined area around the light unit monitoring device 2.

In this case, the light unit monitoring device 2 may distribute the signal information 40 through communication by the mobile communication system as in the first embodiment. Alternatively, the light unit monitoring device 2 may distribute the signal information 40 through wireless communication by ITS (Intelligent Transport System) or wireless communication by Wi-Fi (registered trademark).

When distributing the signal information 40 through wireless communication by ITS or Wi-Fi, the light color start time and the light color start time in the signal information 40 may be represented by relative times. Since the light unit monitoring device 2 and the vehicles V directly communicate with each other in the above wireless communication, a delay caused by the communication does not significantly affect the signal information 40.

[Others]

The embodiments described above are to be considered in all respects as illustrative and not restrictive.

For example, in the first embodiment and the second embodiment, the light unit monitoring device 2 and the information distribution device 4 are communicatively connected to each other through wireless communication using a mobile communication system. However, the light unit monitoring device 2 and the information distribution device 4 may be connected to each other through wired communication.

The first embodiment describes a case where the light unit monitoring device 2 includes the generation unit 36c, the second embodiment describes a case where the information distribution device 4 includes the generation unit 46c, and the third embodiment describes a case where the light unit monitoring device 2 includes the generation unit 36c and the distribution processing unit 36d. However, either the light unit monitoring device 2 or the information distribution device 4 may include a generation unit and/or a distribution processing unit.

In the first embodiment and the second embodiment, the distribution processing unit 46a determines whether or not a vehicle V is a distribution target, based on positional information of the vehicle V However, for example, the distribution processing unit 46a may broadcast signal information 40 regardless of the position of the vehicle V.

In the above embodiments, the sensor 18 such as a CT sensor for detecting a current that flows in the signal line 8a of the signal light unit 8 is used as a monitor unit for monitoring the light color of the signal light unit 8. However, for example, a voltage sensor for detecting a voltage in the signal line 8a may be used as the monitor unit, as long as information regarding the light color of the signal light unit 8 can be acquired from the signal light unit 8 without obtaining control information regarding the signal light unit 8 from the traffic signal controller 10. In this case, as in the case of the CT sensor, whether the signal light 8*b* is in the lighting state or the extinction state can be detected based on the voltage of the signal line 8*a*, whereby the light color of the signal light unit 8 can be monitored.

Alternatively, for example, a device that takes an image of the signal light unit 8 with a camera and analyzes data of the image to output information indicating the light color of the signal light unit 8, may be used as a monitor unit.

In step S9 shown in FIG. 6, the switching prediction notification is outputted when it has been determined that the present time is past a time two minutes before the end time of the use time slot of the timing table 14 (conforming timing table) presently used. However, the aforementioned time period is not limited to two minutes and may be a few minutes, for example. The time period may be set to be shorter, such as one minute, as long as the distribution processing unit 46*a* can stop distribution of inaccurate information within the time period in the distribution stop process, considering an error in time measurement by the traffic signal controller 10, the transmission interval of the information distribution device 4, etc.

The scope of the present disclosure is defined by the scope of the claims rather than the above description, and is intended to include meaning equivalent to the scope of the claims and all modifications within the scope.

REFERENCE SIGNS LIST

1 signal information distribution system
2 light unit monitoring device
4 information distribution device
6 traffic signal unit
8 signal light unit
8*a*, Sal, 8*a*2, 8*a*3 signal line
8*b*, 8*b*1, 8*b*2, 8*b*3 signal light
10 traffic signal controller
10*a* power supply unit
10*b* light unit driver
10*c* control unit
12 on-vehicle communication device
14, 14*a* to 14*d* timing table
16*a* main housing
16*a*l one face
16*b* sub housing
18 sensor
20 connector
22 connection line
24 connector
26 connector
30 communication unit
30*a* antenna
32 processing device
34 relay device
36 processing unit
36*a* reception unit
36*c* generation unit
36*d* distribution processing unit
38 storage unit
40 signal information
42 communication unit
42*a* antenna
44 processing device
46 processing unit
46*a* distribution processing unit
46*c* generation unit
48 storage unit
50 relay/distribution device

The invention claimed is:

1. A signal information generation system configured to generate signal information of a signal light unit including a plurality of signal lights, each of the plurality of signal lights being configured to light in a predetermined color, the signal information being for distribution to vehicles, the system comprising:
a memory device configured to store therein a timing table including scheduled lighting intervals of the plurality of signal lights;
a sensor configured to observe lighting and extinction of the plurality of signal lights; and
a generation processing device configured to generate the signal information, based on an actual lighting interval, of a predetermined signal light among the plurality of signal lights, obtained from an observation result of the predetermined signal light, and on the scheduled lighting interval.

2. A signal information generation method for generating signal information of a signal light unit including a plurality of signal lights, each of the plurality of the signal lights being configured to light in a predetermined color, the signal information being for distribution to vehicle, the method comprising:
obtaining scheduled lighting intervals of the plurality of signal lights from a timing table;
observing lighting and extinction of the plurality of signal lights; and
generating the signal information, based on an actual lighting interval, of a predetermined signal light among the plurality of signal lights, obtained from an observation result of the predetermined signal light, and on the scheduled lighting interval.

3. The signal information generation system according to claim 1, further comprising a distribution processing device configured to distribute, to the vehicles, the signal information generated by the generation processing device.

4. The signal information generation method according to claim 2, further comprising distributing the signal information to the vehicles.

* * * * *